Feb. 17, 1948.　　　F. H. JOHNSON　　　2,436,145
NEPHELOMETER FOR ASSAYING PENICILLIN
Filed Nov. 23, 1943
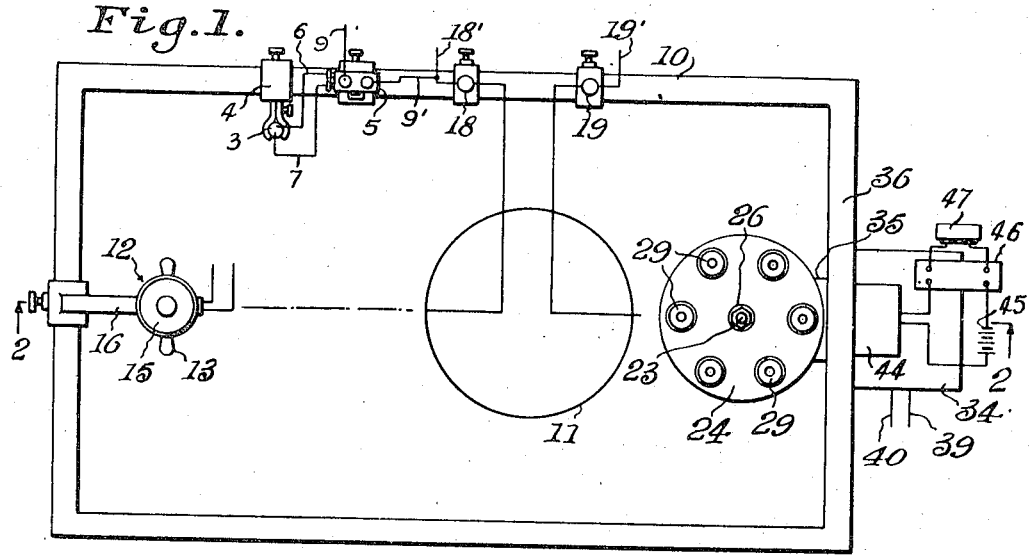
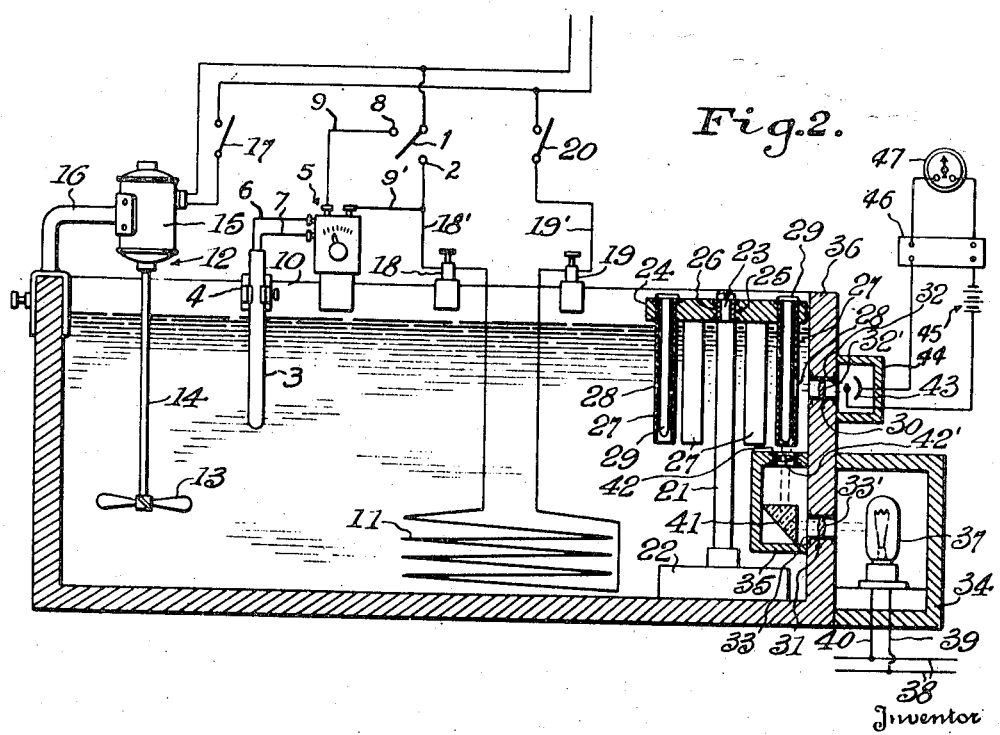
Inventor
Frank H. Johnson
By [signatures]
Attorneys Patented Feb. 17, 1948

2,436,145

UNITED STATES PATENT OFFICE 2,436,145

NEPHELOMETER FOR ASSAYING PENICILLIN

Frank H. Johnson, Princeton, N. J., assignor to the United States of America, as represented by the Secretary of War Application November 23, 1943, Serial No. 511,461

2 Claims. (Cl. 88—14)

This invention relates generally to nephelometry but more particularly to an apparatus for rapidly determining the potency of penicillin and like preparations.

One object of the invention is to provide a simple, direct, and thoroughly practical apparatus for determining bacterial growth in cultures, particularly those which have been incorporated with preparations affecting bacterial growth, such as penicillin and the like.

Another object of this invention is to provide a simple, economical and easily operated apparatus for examining and measuring the growth of micro-organisms in a plurality of cultures in rapid succession.

Another object of the invention is to provide an apparatus for assaying bacterial preparations by which tube cultures may be kept at a constant temperature in a water bath, and the extent of propagation of the micro-organisms automatically indicated without removal of the tubes from said bath, thus affording accuracy of assay and a saving of time and effort.

Another object of the invention is to provide a device for indicating automatically the density of bacterial growth in a plurality of cultures in rapid succession, but with extreme accuracy.

With these and other objects in view, this invention consists in certain novel details of construction, combinations and arrangements of parts to be more particularly hereinafter set forth and claimed.

To afford a better understanding of certain features of the instant invention, it may be noted that penicillin is defined as a broth culture of penicillium which tends to inhibit the growth of gram-positive bacteria. Penicillin is found to possess certain therapeutic properties and therefore it is of utmost importance to have reliable assay methods available for determining its potency. A number of assay devices have heretofore been employed in determining the potency of various penicillin preparations, but the time required in utilizing these devices extends over an exceedingly longer period of time than that required by the apparatus set forth by the instant invention.

In assaying the potency of penicillin, a sample of the preparation is added to a rapidly growing bacterial culture, such as staphylococci, which culture is sensitive thereto with respect to growth. An identical culture, free of penicillin, is employed as a control. It is found that cell growth in the culture containing penicillin varies under standard conditions strictly with the concentration of penicillin employed. Thus, the effect on the growth measured in about one-half to three-fourths of an hour gives, by reference to a standard, such as a graph showing the effects of numerous penicillin preparations on rapidly growing cultures with respect to time, a measure of potency of the penicillin preparation under test. Within limits, it is found that age of the culture, before addition of penicillin, has substantially no effect on final test results.

Briefly stated, the apparatus comprises a multiple carrier for tube cultures, the cultures being maintained at a constant temperature in a water bath, and revolvable into position for instant measurement of the bacterial growth in any one of said tubes by indicating the Tyndal beam effect in the tube. The testing apparatus provided enables the instantaneous recording of the relative number of cells in a culture.

Referring to the drawings, in which like numerals designate similar parts:

Fig. 1 is a top plan view of the assaying apparatus;

Fig. 2 is a sectionalized view taken on the line 2—2 of Fig. 1.

Referring to Fig. 1, the numeral 10 designates a tank filled with water to provide a water bath which may be kept at any desired temperature by means of the heating coil 11 and the agitator 12. The agitator comprises a fan 13 connected to the shaft 14 of a motor 15 which is attached to one end of the tank by means of a bracket 16 and is electrically connected to a power circuit and controlled by a switch 17. The heating coil 11, which is also connected to the power circuit by means of the conductors, 18' and 19' and binding posts 18 and 19, is controlled by a switch 20 when switch blade 1 is on contact 2.

The water bath may be retained at constant temperature automatically by providing for the thermostatic control of the heating coil 11 by means of a temperature responsive element 3 which is attached to a side wall of the tank 10 by means of a clamp 4, and a thermostat 5 which also may be clamped to the tank as shown or located remotely therefrom. The temperature responsive element 3 is connected to the thermostat by means of conductors 6 and 7 and the thermostat is connected to switch contacts 2 and 8 of a two-way switch 1 and to the heating coil by means of the conductors 9, 9' and 18'. When retaining the bath at constant temperature by means of the thermostat 5 the switch 20 is closed and the two-way switch is placed on the terminal 8 so that current from the power line must pass through the thermostat to energize the heating coil.

Adjacent one end of the tank 10 is located a standard 21 which is supported on the bottom of the tank by means of a base 22. The upper extremity 23 of the standard 21 is of smaller diameter than the remaining portion so as to provide an axis on which is mounted a rotatable disc 24. The disc 24 is drilled with a central opening 25 adapted to receive a bushing 26 which fits the upper end 23 of the standard 21 and provides a bearing surface for the disc. Disc 24 is also provided with a plurality of circular openings spaced at equal distances adjacent to the periphery thereof. These circular openings are adapted to accommodate blackened test tube shields 27 which are beaded at their upper extremities to prevent them from passing entirely through the holes, and provided with openings or windows 28 of sufficient diameter to allow the passage of a light beam as will be further described. Within the shields are mounted testtubes 29 containing the preparations to be tested, as well as a tube used as a control.

The end of the tank adjacent the test tube standard is provided with upper and lower circular openings 30 and 31 into which are fitted frames 32 and 33 adapted to retain lenses 32' and 33' to provide watertight windows as shown in Fig. 2. Adjacent the lower lens a lamp housing 34 and watertight prism housing 35 are provided to extend respectively exteriorly and interiorly from the end wall 36 of the tank.

In the outwardly extending lamp housing 34 is located a lamp 37 of constant intensity which is connected to a source of power 38 by means of the conductors 39 and 40. The lamp 37 is so positioned that a beam therefrom is directed through the lens 33' to a prism 41 which changes its direction and projects it vertically upward through a lens 42' in circular frame 42 providing a watertight lens window in the top of the prism housing 35. From the lens 42' the light beam is projected upward through the liquid in the tank and within a shield 27 and test tube 29 where it illuminates the culture or preparation contained therein.

Surrounding the upper lens opening 30 in the end wall 36 of the tank, a third housing 44 is provided which projects outwardly from the end wall 36 and within which is mounted a photoelectric cell 43 which is connected in a circuit including a source of electrical energy 45, an amplifier 46, and a galvanometer 47 as diagrammatically shown in the drawings. Radiations from the light beam projected into the test tube are received by the photoelectric cell 43 through the window or hole 28 in the test tube shield 27 and the resulting variation in photoelectric current produced by the Tyndall beam effect in the tube will be indicated by the galvanometer.

Thus by the method and apparatus described above, the testing of penicillin or the like by addition of such preparation to a rapidly growing culture of susceptible bacteria, noting the effect on growth after a short time and basing a determination of potency on such effect, can be easily and rapidly accomplished.

It is evident that bacteriostatic action of various substances will have to be analyzed ultimately in terms of the effect of these compounds on the rate of growth rather than purely in terms of result. It will also be noted that between the time that the culture is inoculated and the time it reaches full development, many changes take place which complicate the analysis. Furthermore, by studying the action of a compound over short periods of time with rapidly growing cultures, a clearer insight into the basic mechanism of action is possible.

Another aspect of the problem is the nature of the penicillin production in relation to time. Because of the transitory peak in concentration, it may make a great deal of difference to be able to tell whether it would be best to harvest the material the same day it is assayed rather than to wait until the following day.

However, the apparatus disclosed is not limited in use to the measurement of bacteriostatic effect, but may also be employed in determining the rate of a precipitin reaction at various dilutions of antigen, and the rate of glycolysis measured by change in color or density of color of an appropriate indicator, and in other types of experiment that can be carried out densimetrically.

In the instant device, time and effort in operation are reduced to a minimum as it is only necessary for the operator to effect a slight rotation of the disc 24 to bring the various test tubes into the path of the light beam and to note the reading of the galvanometer to determine the status of growth in the various tubes.

Having described my invention, what I claim as new and desire to secure by Letters Patent is:

1. An apparatus for assaying the potency of bacteriostatic preparations comprising a water bath container, means including a heating coil and an agitator in the container for maintaining said bath at a constant temperature, a nephelometer associated with said container including a constant intensity light source and a photoelectric cell mounted within housings attached respectively to the upper and lower portions of the exterior of said container and communicating with the interior thereof respectively through upper and lower lens windows therein, a housing attached to the interior of said container opposite said light source housing and provided with a lens window and a prism placed intermediate said light source and said window and adapted to direct horizontal rays from said light source vertically within said water bath, a test tube support mounted within said container, the said test tube support including a disc rotatably mounted in the container and means enabling rotation of the disc through predetermined arcs, tubular opaque light shields carried by the disc, test tube means containing specimens of the preparation to be assayed received in the shields, means on the shields for supporting the test tube means, each of the shields being provided with a light transmitting window at its lower extremity and a second window in its side wall, the window in the extremity of each of the light shields being brought into vertical alignment with the lens window of the external housing and the light window in the side wall of the light shield being brought simultaneously into alignment with the lens window of the photoelectric cell responsively to predetermined rotation of the disc whereby rays from said light source can pass through said windows of each light shield to effect energization of the photoelectric cell proportionate to the concentration of the preparation in the test tube means, and means in electrical connection with said cell for indicating the degree of energization thereof to determine the potency of said preparations.

2. An apparatus for assaying the potency of bacteriostatic preparations comprising a water bath container, means for maintaining said bath at a constant temperature, means for directing a beam from a constant intensity light source perpendicularly through said bath, a photoelectric cell inclosed within a housing having a lens window communicating with said bath and adapted to receive horizontal rays, a test tube support including a disc rotatably mounted in the container and means enabling rotation of the disc through predetermined arcs, tubular opaque light shields carried by the disc adapted to receive test tube means containing specimens of the preparation to be assayed, the shields being provided with means for supporting the test tube means, each of the shields being provided with a light transmitting window at its lower extremity and a second window in its side wall, the window in the extremity of each of the light shields being brought into vertical alignment with the perpendicularly directed beam of the constant intensity light source and the light window in the side wall of the light shield being brought simultaneously into alignment with the lens window of the photoelectric cell housing responsively to predetermined relation of the disc whereby rays from said light source can pass through said windows of each light shield to effect energization of the photoelectric cell proportionate to the concentration of the preparation in the test tube means, and means in electrical connection with said cell for indicating the degree of energization thereof to determine the potency of said preparations.

FRANK H. JOHNSON.

REFERENCES CITED

The following references are of record in the file of this patent:

UNITED STATES PATENTS

| Number | Name | Date |
|---|---|---|
| 1,914,937 | Bodine | June 20, 1933 |
| 2,193,315 | Evelyn | Mar. 12, 1940 |
| 2,293,890 | Dutky | Aug. 25, 1942 |
| 2,301,401 | Hennessy et al. | Nov. 10, 1942 |
| 2,359,736 | Kienle et al. | Oct. 10, 1944 |

FOREIGN PATENTS

| Number | Country | Date |
|---|---|---|
| 60,982 | Norway | June 12, 1939 |

OTHER REFERENCES

"The Photronic Nephelometer," an article by C. H. Greene in Journal of the American Chemical Society for June 1934; pages 1270 and 1271 cited. (Copy in Scientific Library, U. S. Patent Office.)